United States Patent
Chaplin

(10) Patent No.: US 9,467,226 B2
(45) Date of Patent: Oct. 11, 2016

(54) CONTROLLING BRIGHTNESS OF LIGHT SOURCES USED FOR DATA TRANSMISSION

(71) Applicant: Samsung Electronics Co., Ltd., Suwon-si, Gyeonggi-do (KR)

(72) Inventor: Clint F. Chaplin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/309,793

(22) Filed: Jun. 19, 2014

(65) Prior Publication Data

US 2014/0301738 A1    Oct. 9, 2014

Related U.S. Application Data

(62) Division of application No. 12/755,228, filed on Apr. 6, 2010, now Pat. No. 8,798,479.

(60) Provisional application No. 61/266,482, filed on Dec. 3, 2009.

(51) Int. Cl.
*H04B 10/06* (2006.01)
*H04B 10/116* (2013.01)
*H04B 10/114* (2013.01)

(52) U.S. Cl.
CPC ......... *H04B 10/116* (2013.01); *H04B 10/1149* (2013.01)

(58) Field of Classification Search
CPC .............. H04B 10/116; H04B 10/114; H04B 10/1149; H04B 10/1143; H04B 7/1858; H04B 10/524; H04B 14/026; H04B 10/60; H04B 10/695; H04L 1/0047; H04L 25/4906; H04L 27/223; H04J 14/005
USPC ........ 398/128, 130, 135, 138, 140, 154, 172, 398/182, 183, 189, 202, 118, 126, 127
See application file for complete search history.

(56) References Cited

U.S. PATENT DOCUMENTS

| | | | | |
|---|---|---|---|---|
| 5,307,194 | A * | 4/1994 | Hatton | H04B 10/1121 250/504 R |
| 6,195,025 | B1 * | 2/2001 | Hassner | H03M 5/14 341/58 |
| 6,721,081 | B1 * | 4/2004 | Mauro | G02F 1/0123 359/239 |
| 7,332,877 | B2 * | 2/2008 | Crodian | B60Q 1/1423 315/292 |

(Continued)

FOREIGN PATENT DOCUMENTS

| | | |
|---|---|---|
| CN | 1596054 A | 3/2005 |
| CN | 1642378 A | 7/2005 |

(Continued)

OTHER PUBLICATIONS

Chinese Office Action dated Jun. 30, 2014 for Chinese Application No. 201080054914.6 from China Patent Office, pp. 1-12, Beijing City, China (Machine-generated English-language translation, pp. 6-12).

*Primary Examiner* — Hibret Woldekidan
(74) *Attorney, Agent, or Firm* — Sherman IP LLP; Kenneth L. Sherman; Steven Laut

(57) ABSTRACT

A method includes receiving a transmitted code via visible light communication from a light source. The transmitted code is decoded using a translation table. The translation table indicates raw data corresponding to the transmitted code as well as a duty cycle corresponding to the transmitted code.

10 Claims, 5 Drawing Sheets

(56) References Cited

U.S. PATENT DOCUMENTS

| | | | | |
|---|---|---|---|---|
| 7,550,934 B1* | 6/2009 | Deng | H05B 33/0887 | 315/209 R |
| 7,950,587 B2* | 5/2011 | Henson | B82Y 10/00 | 235/493 |
| 8,107,825 B2* | 1/2012 | Rajagopal | H04B 10/116 | 398/172 |
| 8,519,925 B2* | 8/2013 | Phan | G09G 3/342 | 345/204 |
| 8,699,887 B1* | 4/2014 | Rothenberg | H04B 10/116 | 315/158 |
| 8,798,479 B2* | 8/2014 | Chaplin | H04B 10/116 | 398/130 |
| 8,942,572 B2* | 1/2015 | Rothenberg | H04B 10/116 | 315/158 |
| 9,065,562 B2* | 6/2015 | Kim | H04B 10/1149 | |
| 9,088,361 B2* | 7/2015 | Castor | H04B 10/1149 | |
| 2006/0072252 A1* | 4/2006 | Sluijs | H02M 3/33561 | 361/18 |
| 2006/0164645 A1 | 7/2006 | Hietanen et al. | | |
| 2006/0275041 A1* | 12/2006 | Kitaji | H03D 9/00 | 398/182 |
| 2009/0110405 A1* | 4/2009 | Lee | H04B 10/116 | 398/130 |
| 2011/0243570 A1* | 10/2011 | Kim | H04B 10/114 | 398/140 |
| 2015/0086213 A1* | 3/2015 | Pederson | G07C 9/00158 | 398/128 |

FOREIGN PATENT DOCUMENTS

| | | |
|---|---|---|
| CN | 1674754 A | 9/2005 |
| CN | 101321421 A | 12/2008 |
| JP | 2007287202 A | 11/2007 |

* cited by examiner

CONTROLLING BRIGHTNESS OF LIGHT SOURCES USED FOR DATA TRANSMISSION

CROSS-REFERENCE TO RELATED APPLICATIONS

This divisional application claims priority from U.S. patent application Ser. No. 12/755,228 filed Apr. 6, 2010, which claims priority from U.S. Provisional Patent Application Ser. No. 61/266,482, filed Dec. 3, 2009, both incorporated herein by reference.

TECHNICAL FIELD

The present invention relates to light resources. More particularly, the present invention relates to the controlling of brightness of light resources used for data transmission.

BACKGROUND

Visible Light Communication is a branch of communications research dealing with communicating data via visible light. It has gained popularity in recent years due to the increasing prevalence of light emitting diodes (LEDs), which have special properties that make them outstanding sources (and receivers) for data via visible light. LED has the special characteristic of being able to turn the light on and off very fast. Data can then be transmitted by turning LEDs on and off at ultra high speed.

The basic idea is that this light resource, which is commonly used to merely transmit visible light to people can simultaneously be used to transmit data. As LEDs grow even more prevalent, it becomes possible for ubiquitous amounts of light sources to be used as data transmission resources. Light fixtures, traffic lights, brake lights, active billboards, etc. can all be used to transmit information rather than just light.

In one example, gas can be saved on a car or truck by turning the engine off while waiting at red lights. Currently, however, it is impractical to do so, as the delay in starting the car or truck back up when the light turns green would increase traffic. If the traffic lights were equipped with LEDs, however, as is already becoming prevalent for energy savings purposes, the traffic lights could be configured to send a data signal to a car informing it of an impending transition between red and green. The car could then be configured to start up and be ready for forward movement as soon as the light turns green.

Such visible light communication also has advantages over other types of wireless transmission. Radio Frequency (RF) data transmission, for example, is essentially omnidirectional, which would limit its ability to focus the data to particular locations. In the traffic light example, using RF would be impractical because cars traveling in other directions (or even at traffic lights) would all receive the same signal. The line-of-sight aspect of visible light communication prevents this type of "data transmission leakage." Another advantage is that RF communications have power constraints, either set by the Federal Communications Commission (FCC) or just inherent in the fact that high power may be needed to transmit at certain frequencies. Visible light communication suffers from no such power constraints. Another advantage is that LEDs are already becoming prevalent as light sources merely for their power savings features, and these LEDs can be used to transmit the visible light communication without needing to replace large amounts of hardware. Furthermore, RF transmissions are prohibited in certain locations, such as on or near operating aircraft, and in hospitals, due to potential interference with electronic equipment. Visible light communications are not subject to these prohibitions.

Visible light communication also has advantages over Infrared (IR) communication. Both visible light and IR communications have the similar bandwidth (a few 100 THz). However, Infrared Data Association (IrDA) communication has an eye safety problem in conjunction with the possible dangerous high energy density due to its invisibility. Therefore, higher data rate transmissions cannot be accomplished through IR communication. As compared to IR communication, the visible light communication is more suitable to human eyes in terms of "Visibility", and is capable of transmitting data at a much higher rate.

Another advantage of Visible Light Communication over IR is that, since the communication beam can be seen, the location of where the beam is pointing can be observed, which aids in determining if the intended recipient can receive the beam as well as aid in preventing improper recipients (hackers, eavesdroppers, etc.) from receiving the beam.

One unusual (and not well known) fact about LEDs is that they can be used not only to transmit visible light communication but also to receive them. This widens even further the potential applicability of visible light communication. In the traffic light example described above, a car sitting behind a truck at a traffic signal may not have direct line of sight to the traffic light, and therefore direct data transmission between the traffic light and the car may be blocked. However, the various LEDs in the "system" can essentially be daisy-chained together. The trucks headlights can act as a receiver to receive the data from the traffic light, and then the trucks taillights can retransmit this data, which can then, in turn, be received by the car's headlight.

IEEE 802.15.7 is a standards body working group that is putting together a common standard for visible light communication. Current methods for visible light communication encode the data using a scheme that sets the output duty cycle of the encoded data to a fixed value of 50%. At this fixed amount, brightness would be at a constant level. Changes in brightness are accomplished by inserting frames into the output stream that do not represent data at all, but instead contain patterns that gave a duty cycle other than 50%. These "blank" frames do not contain data at all, but are used exclusively to control the brightness of the light source. This allows the overall brightness of the light source to be controlled.

The problem with this approach, however, is that the blank frames use up a portion of the transmission time that could otherwise be used to transmit data. This reduces the potential throughput of the system, and in fact the further away the system needs to get from 50% the worse the throughput gets (as more blank frames are needed to change the perception of brightness). Furthermore, this solution adds complexity to the transmitter, in that in order to precisely control the overall brightness, the duty cycle of the patterns in the blank frames will have to compensate for the 50% duty cycle of the data carrying frames. In order to perform this compensation, the transmitter will have to know much data is being transmitted.

SUMMARY

In a first embodiment of the present invention, a method is provided comprising: receiving a selection of a desired brightness level of a light source; receiving a piece of data to be transmitted via visible light communication using the light source; selecting a duty cycle, described by an encoding scheme, based on the desired brightness level; encoding the data using the encoding scheme, wherein the encoding includes identifying a code corresponding to both the piece of data and the selected duty cycle; and transmitting the identified code via visible light communication using the light source.

In a second embodiment of the present invention, a method is provided comprising: receiving a transmitted code via visible light communication from a light source; and decoding the transmitted code using a translation table, wherein the translation table indicates raw data corresponding to the transmitted code as well as a duty cycle corresponding to the transmitted code.

In a third embodiment of the present invention, an apparatus is provided comprising: a light receiver configured to receive a transmitted code via visible light communication from a light source; and a decoding engine configured to decode the transmitted code using a translation table, wherein the translation table indicates raw data corresponding to the transmitted code as well as a duty cycle corresponding to the transmitted code.

In a fourth embodiment of the present invention, an apparatus is provided comprising: a light receiver configured to receive a transmitted code via visible light communication from a light source; and a decoding engine configured to decode the transmitted code using a translation table, wherein the translation table indicates raw data corresponding to the transmitted code as well as a duty cycle corresponding to the transmitted code.

In a fifth embodiment of the present invention, an apparatus is provided comprising: means for receiving a selection of a desired brightness level of a light source; means for receiving a piece of data to be transmitted via visible light communication using the light source; means for selecting a duty cycle, described by an encoding scheme, based on the desired brightness level; means for encoding the data using the encoding scheme, wherein the encoding includes identifying a code corresponding to both the piece of data and the selected duty cycle; and means for transmitting the identified code via visible light communication using the light source.

In a sixth embodiment of the present invention, an apparatus is provided comprising: means for receiving a transmitted code via visible light communication from a light source; and means for decoding the transmitted code using a translation table, wherein the translation table indicates raw data corresponding to the transmitted code as well as a duty cycle corresponding to the transmitted code.

In a seventh embodiment of the present invention, a program storage device readable by a machine is provided, tangibly embodying a program of instructions executable by the machine to perform a method comprising: receiving a selection of a desired brightness level of a light source; receiving a piece of data to be transmitted via visible light communication using the light source; selecting a duty cycle, described by an encoding scheme, based on the desired brightness level; encoding the data using the encoding scheme, wherein the encoding includes identifying a code corresponding to both the piece of data and the selected duty cycle; and transmitting the identified code via visible light communication using the light source.

In an eighth embodiment of the present invention, a program storage device readable by a machine is provided, tangibly embodying a program of instructions executable by the machine to perform a method comprising: receiving a transmitted code via visible light communication from a light source; and decoding the transmitted code using a translation table, wherein the translation table indicates raw data corresponding to the transmitted code as well as a duty cycle corresponding to the transmitted code.

DETAILED DESCRIPTION

Figure 1:
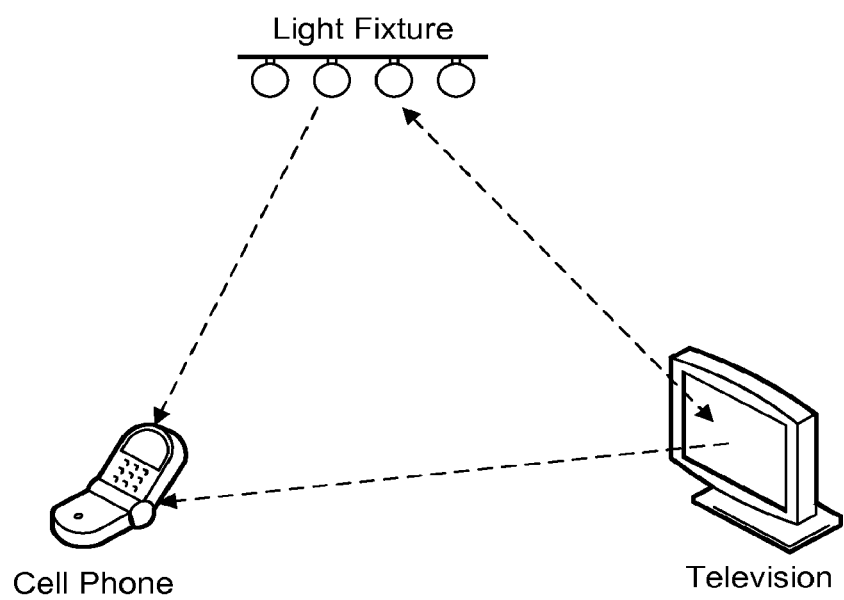
FIG. 1 is a diagram illustrating an example of a visible light communication system in a home.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, large amounts of data can be sent via visible light while simultaneously controlling the light source brightness. This is accomplished by providing an encoding scheme that provides for different codes for the same data at different duty cycles. At the transmission side, a particular duty cycle is selected approximating the desired brightness. The data is then encoded by selecting the code associated with the data and also associated with the particular duty cycle. On the receive side, the encoded information is compared with a translation table to decode the information into its desired raw data.

In one very simple example, the encoding scheme takes two data bits and encodes them into four bits for transmission, as seen in Table 1.

TABLE 1

|  |  | Data | | | |
|---|---|---|---|---|---|
|  |  | 00 | 01 | 10 | 11 |
| Duty Cycle | 25% | 0001 | 0010 | 0100 | 1000 |
|  | 50% | 1001 | 0110 | 1100 | 0011 |
|  | 75% | 1110 | 1101 | 1011 | 0111 |

Note that the encoded patterns are unique. The receiver does not need to know what the duty cycle is in order to convert the encoded patterns back into data. A simple look-up table can be used to encode the data, with inputs of "Duty Cycle" and "Data", while another simple look-up table can be used at the receiver to recover the data and optionally also recover the duty cycle (the reasons for which will be described later in this document).

Note that in this example only three data cycles are possible: 25%, 50%, and 75%. However, mixing the duty cycles for successive encodings would allow for mixtures of the three base duty cycles to be created, with overall duty cycles of the mix to be anywhere between 25% and 75%. For example, to achieve an overall duty cycle of 37.5% (brightness level of 37.5%), the system can alternate evenly between encodings at 25% and 50%.

In one optional embodiment of the present invention, bit patterns corresponding to 100% or 0% duty cycles, without representing encoded data, can be inserted into the data stream. Note that the encoded patterns in Table 1 do not include the bit patterns "1111" and "0000". If a duty cycle below 25% or above 75% is required, these two special data patterns can be inserted into the encoded stream in the desired ratio to cause the average duty cycle to be the required duty cycle. When the receiver receives these two special data patterns they are discarded. The disadvantage to inserting "1111" or "0000" is that the overall data throughput will decrease, as these frames are only useful to modify the visible brightness of the light, and do not in themselves represent any data.

In another optional embodiment of the present invention, bit patterns corresponding to synchronization patterns can be inserted into the data stream, to allow the transmitter and receiver to synchronize up to ensure that data is not misunderstood. Note that the bit patterns "1010" and "0101" are not used in Table 1, and thus can be used for synchronization, if needed. These particular bit patterns are also useful in that the patterns themselves represent the highest possible frequency for a pattern of bits, which make them correspondingly the best types of patterns to use for quick synchronization.

In another example encoding scheme, 3-to-8 bit encoding is utilized. This is illustrated in Table 2 below.

TABLE 2

|  |  | Data | | | | | | | |
|---|---|---|---|---|---|---|---|---|---|
|  |  | 000 | 001 | 010 | 011 | 100 | 101 | 110 | 111 |
| Duty Cycle | 12.5 | 00000 | 00000 | 00000 | 00001 | 00010 | 00100 | 01000 | 10000 |
|  | 25.0 | 00000 | 00000 | 00001 | 00011 | 00110 | 01100 | 11000 | 10000 |
|  | 37.5 | 00000 | 00001 | 00011 | 00111 | 01110 | 11100 | 11000 | 10000 |
|  | 50.0 | 00001 | 00011 | 00111 | 01111 | 11110 | 11100 | 11000 | 10000 |
|  | 62.5 | 00011 | 00111 | 01111 | 11111 | 11110 | 11100 | 11000 | 10001 |
|  | 75.0 | 00111 | 01111 | 11111 | 11111 | 11110 | 11100 | 11001 | 10011 |
|  | 87.5 | 11111 | 11111 | 11111 | 11110 | 11101 | 11011 | 10111 | 01111 |

This encoding scheme provides the advantage of having more inherent control over the duty cycle levels. However, the 3-to-8 bit encoding scheme utilizes more bits to send the same amount of information as the 2-to-4 bit encoding scheme of Table 1.

Of course, these encoding schemes are merely provided as examples. One of ordinary skill in the art will recognize that there are a number of different encoding schemes that can be used with the present invention, and nothing in this document shall be construed as limiting the encoding scheme to particular types, unless explicitly recited in the claims. In the end, of course, the system builder must strike a balance between the level of brightness control and the throughput of the system.

In another optional embodiment of the present invention, since the receiver can also recover the Duty cycle by decoding the visible light communication, it is also possible to send some limited data through the choice of the duty cycle as well. In other words, the sender could chose the Duty cycles based on information to be sent, which the receiver could receive by decoding the duty cycle.

There are various different embodiments to which the novel methods and apparatuses described in this document could be applied. In one example, a cellular phone could be equipped with a visible light communication receiver. Many cell phones currently use LCD technology for their display screens, and such LCDs include LED backlights that could be used as visible light communication receivers. Alternatively, dedicated visible light communication receivers could be integrated into cell phone housings much in the way that many cell phones currently had dedicated IR receivers built in. Equipping a cell phone with a visible light communication receiver in accordance with the present invention would allow high-speed data to be passed to the cell phone without utilizing valuable bandwidth on the typical cellular phone medium (e.g., GPRS, 3G). Various devices could then be programmed as visible light transmitters. A LCD television set, for example, could be hardwired to the user's broadband connection and then transmit data from and to the broadband connection between the cell phone and the television set. Similar connections could be made through many different home devices, such as light bulbs, refrigerators, ovens, digital video recorders (DVRs), etc. Indeed, these devices could all be configured to communicate data between themselves, eliminating the need for hardwired broadband connections to all but one of the devices. FIG. 1 is a diagram illustrating an example of a visible light communication system in a home. Of course, the embodiment above would not just be limited to cellular phones, as similar advantages could be obtained by using any portable device, such as a handheld or laptop computer, or MP3 player. In addition, the status LEDs on the phone itself can be used to transmit data out of the cell phone to a receiver.

Figure 2:
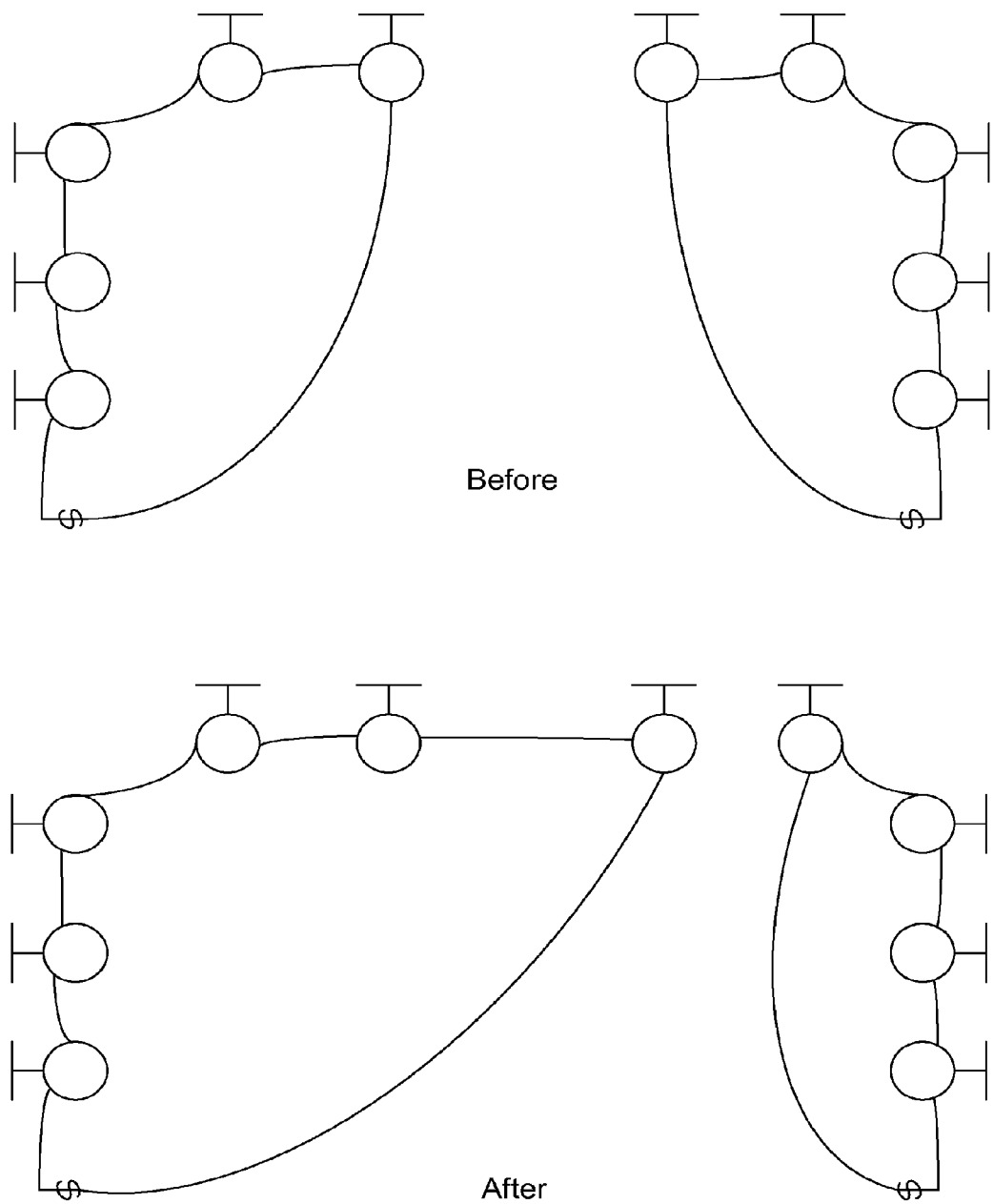
FIG. 2 is a diagram illustrating how traditional physical cables between light fixtures would have to be altered in order to change wall switch configuration.

Embodiments are also foreseen where the visible light communication is utilized for control signals. FIG. 2 is a diagram illustrating how traditional physical cables between light fixtures would have to be altered in order to change wall switch configuration. As can be seen in FIG. 2, traditional light fixtures attached to light switches require not only dedicated power to each fixture, but a hardwire must be connected from the light switch to each and every fixture to be controlled by the switch. In certain instances, however, this may make adding additional light fixtures more difficult. For example, in a "before" scenario, a room may have two different light switches, each controlling 5 lights in the room. If the user wanted to have the first switch control 6 of the lights, while the second switch only controls 4 of the lights, this would require rewiring the loops so that the 6 lights in question were on one switch's loop, while the other 4 lights were on the other switch's loop (the "after" scenario). At best this would require some wiring know-how from the user and at worse it might require opening up the wall to run the additional wiring. If the light fixtures were each equipped with visible light communication LEDs, however, control signals could be passed between the fixtures (and the switches) enabling a simple programming change to alter which switch controlled which fixtures, without requiring any change in the physical wiring of the system.

An additional advantage of utilizing these existing devices as visible light communication transmitters/receivers is that they already have their own power supplies. Adding a dedicated visible light communication transmitter to a house might require adding a power line or utilizing battery power. Upgrading a light bulb, however, to a visible light communication-compatible LED, requires no such power concerns as the light fixture already has a dedicated power line.

Figure 3:
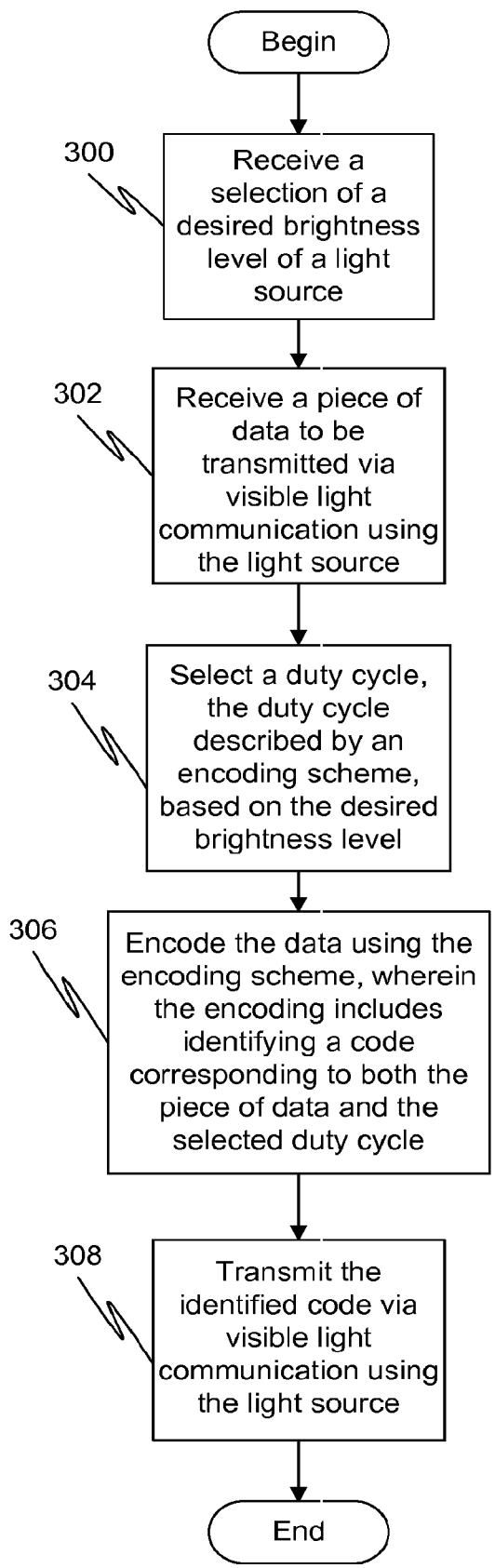
FIG. 3 is a flow diagram illustrating a method for controlling brightness of light sources used for data transmission in accordance with an embodiment of the present invention.

FIG. 3 is a flow diagram illustrating a method for controlling brightness of light sources used for data transmission in accordance with an embodiment of the present invention. This diagram illustrates the "transmit side." At 300, a selection of a desired brightness level of a light source is received. There may be a number of different ways this selection may be received, depending upon implementation. In one example, a user may explicitly indicate a brightness level. This may be set, for example, via a level on a dimmer light switch, or a brightness setting on a computer or cell phone display. In another embodiment, the brightness level may be automatically set, such as in a set sequence (e.g., street lamps being dimmed at certain portions of the day/night). In another embodiment the brightness level may be more or less fixed at a specific level, such as in a traffic light.

At 302, a piece of data to be transmitted via visible light communication using the light source is received. Once again, there may be a number of different ways this data may be received, depending upon implementation. In one example, a user may explicitly recite data to be transmitted. In another example, the data may be automatically specified, such as in a control signal.

At 304, a duty cycle is selected, the duty cycle described by an encoding scheme, based on the desired brightness level. As was described previously, the encoding scheme may specify certain base duty cycles. The system may then select the base duty cycle closest to the desired brightness level. For more control, if the desired brightness level is between two of the base duty cycles, the system may select one of the two base duty cycles to transmit one piece of data, and then the other base duty cycle for a subsequent piece of data, making a sequence of pieces of data that overall wind up giving something approximating the desired brightness level.

In cases where the desired brightness level is below the lowest base duty cycle specified by the encoding scheme, then additional light frames at zero brightness can be added after transmission of the piece of data, resulting in an overall duty cycle across multiple pieces of data equivalent to (i.e., approximating) the desired brightness level. Similarly, in cases where the desired brightness level is above the highest base duty cycle specified by the encoding scheme, then additional light frames at full (i.e., 100%) brightness can be added after transmission of the piece of data, resulting in an overall duty cycle across multiple pieces of data equivalent to (i.e., approximating) the desired brightness level. In one embodiment, this might also include transmitting additional data through the selection of the duty cycle itself.

At 306, the data is encoded using the encoding scheme, wherein the encoding includes identifying a code corresponding to both the piece of data and the selected duty cycle. This may include referencing a translation table having raw data values on one axis and duty cycles on the other axis, with unique codes for each entry in the table. Examples of such tables are illustrated in Tables 1 and 2 above.

At 308, the identified code is transmitted via visible light communication using the light source.

Figure 4:
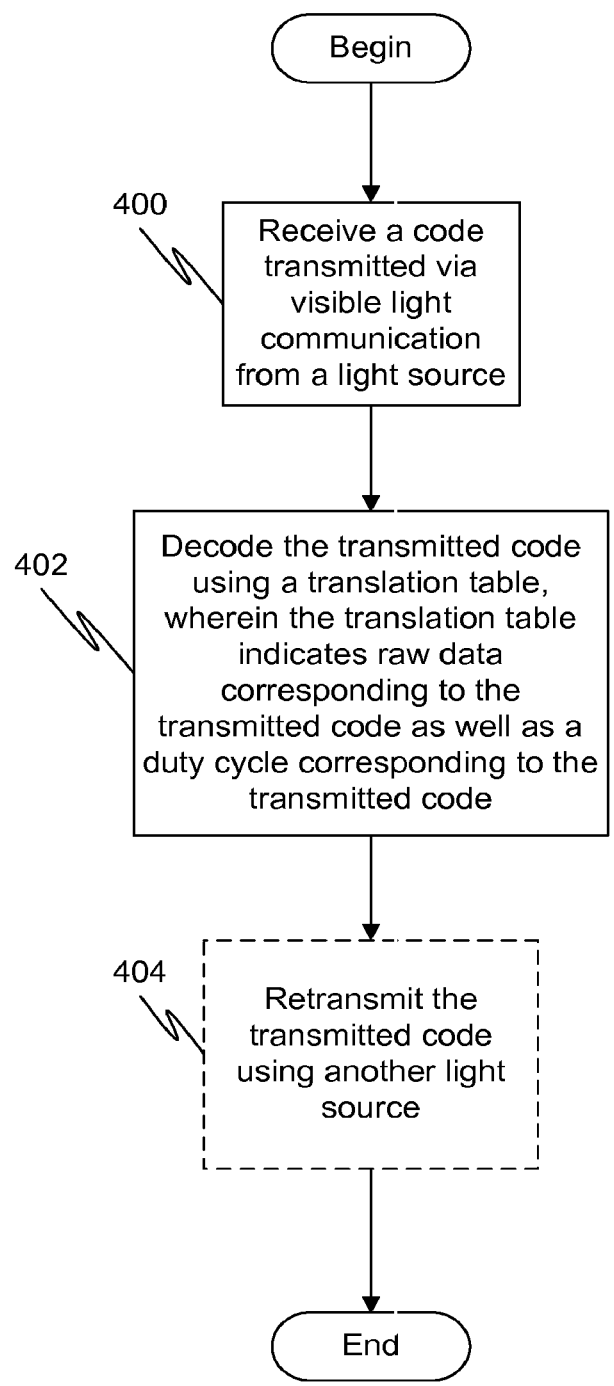
FIG. 4 is a flow diagram illustrating a method for controlling brightness of light sources used for data transmission in accordance with another embodiment of the present invention.

FIG. 4 is a flow diagram illustrating a method for controlling brightness of light sources used for data transmission in accordance with another embodiment of the present invention. This diagram illustrates the "receive-side".

At 400, a code transmitted via visible light communication from a light source is received. At 402, the transmitted code is decoded using a translation table, wherein the translation table indicates raw data corresponding to the transmitted code as well as a duty cycle corresponding to the transmitted code. This translation table may have raw data values on one axis and duty cycles on the other axis, with unique codes for each entry in the table. Examples of such tables are illustrated in Tables 1 and 2 above.

At 404, the transmitted code may be retransmitted using another light source. This is an optional step, as the decoded data can be used by any module or device that has use for it. However, as described above, in one embodiment of the present invention a receiver can act not only as a light receiver but also as a light source, and this step is intended to cover this embodiment.

Figure 5:
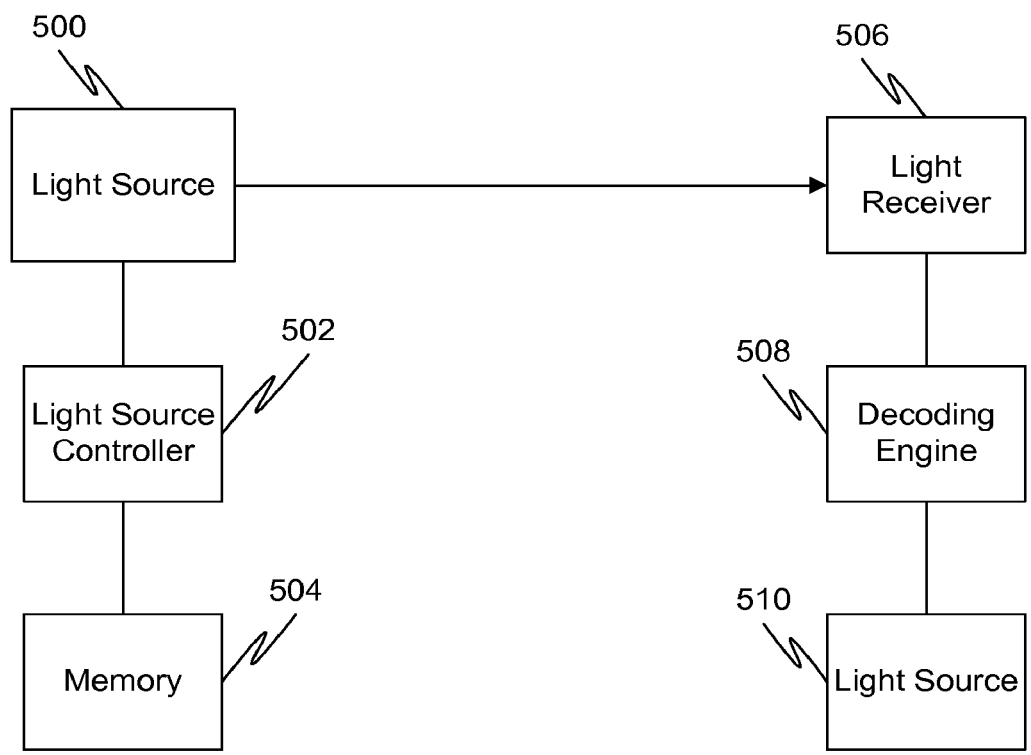
FIG. 5 is a block diagram illustrating a system for controlling brightness of light sources used for data transmission in accordance with another embodiment of the present invention.

FIG. 5 is a block diagram illustrating a system for controlling brightness of light sources used for data transmission in accordance with another embodiment of the present invention. A light source 500 may be coupled to a light source controller 502. The light source controller can be configured to perform the actions recited above with respect to FIG. 3. A memory 504 may also be coupled to the light source controller 502, the memory storing one or more translation tables used by the light source controller 502. It should be noted that in some embodiments the light source controller 502 and/or the memory 504 could be incorporated into the light source 500 itself, whereas in other embodiments the light source controller 502 and/or the memory may be separate. Embodiments are also possible where the light source 500 is separate from the light source controller 502, but the memory 504 is incorporated into the light source controller 502. It should also be noted that the light source controller 502 could conceivably be designed to control multiple light sources, and thus could be connected to those other light sources as well.

On the receive side, a light receiver 506 may be configured to receive a transmitted code via visible light communication from a light source, while a decoding engine 508 may be configured to decode the transmitted code using a translation table, wherein the translation table indicates raw data corresponding to the transmitted code as well as a duty cycle corresponding to the transmitted code. In some embodiments, the light receiver may be in itself a light source, such as an LCD. Additionally, the receive side may also include a light source 510 configured to retransmit the transmitted code.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method comprising:
   receiving a transmitted code via visible light communication from a light source; and
   decoding the transmitted code using a translation table, wherein each entry in the translation table has a unique code associated with raw data and with a duty cycle, and an overall desired duty cycle is based on a selected first duty cycle for a first piece of data and a subsequently selected second duty cycle for a second piece of data that is added after transmission of the first piece of data to approximate a desired brightness level.

2. The method of claim 1, wherein the overall desired duty cycle indicates data in addition to the decoded raw data.

3. The method of claim 1, further comprising:
   retransmitting the transmitted code using another light source.

4. The method of claim 1, wherein the transmitted code is encoded using a selected encoding scheme based on identifying a duty cycle for the desired brightness level in reference to multiple cycles described by the selected encoding scheme.

5. The method of claim 4, wherein the selected second duty cycle is selected for the second piece of data that is a subsequent piece of data to the first piece of data.

6. The method of claim 5, wherein the overall desired duty cycle spans across the first piece of data and the second piece of data that is transmitted after the first piece of data equivalent to approximate the desired brightness level.

7. An apparatus comprising:
   a light receiver configured to receive a transmitted code via visible light communication from a light source; and
   a decoding engine configured to decode the transmitted code using a translation table, wherein each entry in the translation table has a unique code associated with raw data and with a duty cycle, and an overall desired duty cycle is based on a selected first duty cycle for a first piece of data and a subsequently selected second duty cycle for a second piece of data that is added after transmission of the first piece of data to approximate a desired brightness level.

8. The apparatus of claim 7, wherein the light receiver in itself is a light source.

9. The apparatus of claim 7, further comprising a light source configured to retransmit the transmitted code.

10. An apparatus comprising:
    means for receiving a transmitted code via visible light communication from a light source; and
    means for decoding the transmitted code using a translation table, wherein each entry in the translation table has a unique code associated with raw data and with a duty cycle, and an overall desired duty cycle is based on a selected first duty cycle for a first piece of data and a subsequently selected second duty cycle for a second piece of data that is added after transmission of the first piece of data to approximate a desired brightness level.

\* \* \* \* \*